UNITED STATES PATENT OFFICE.

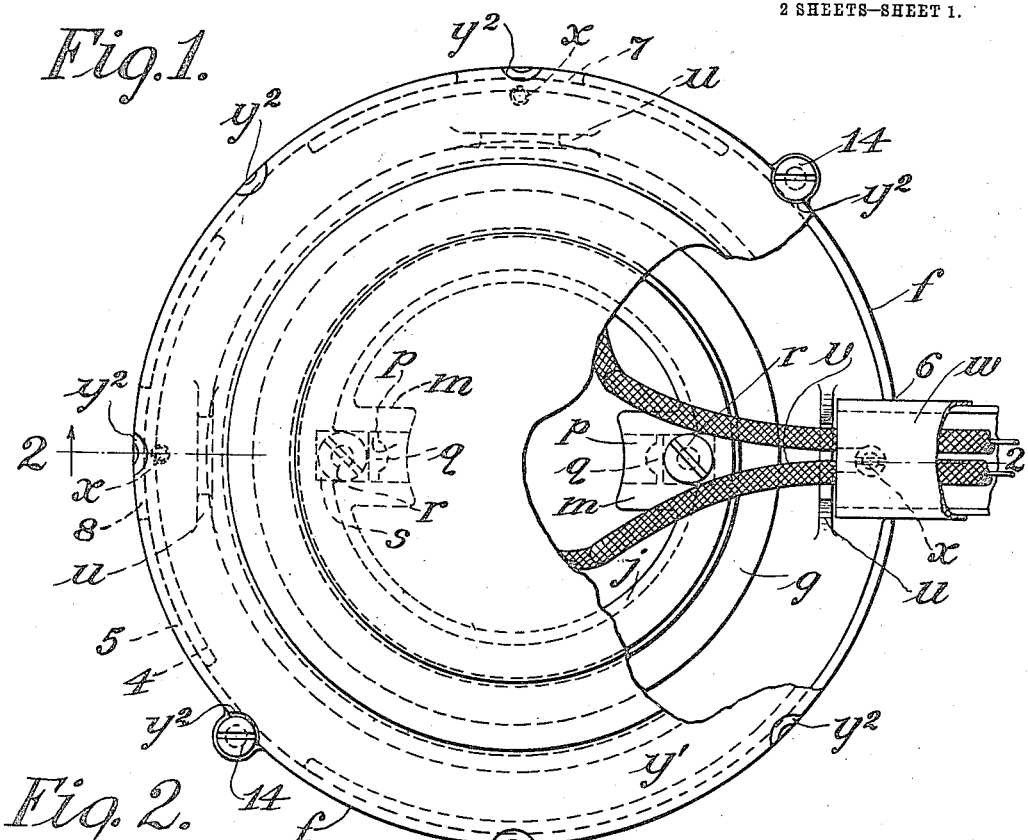

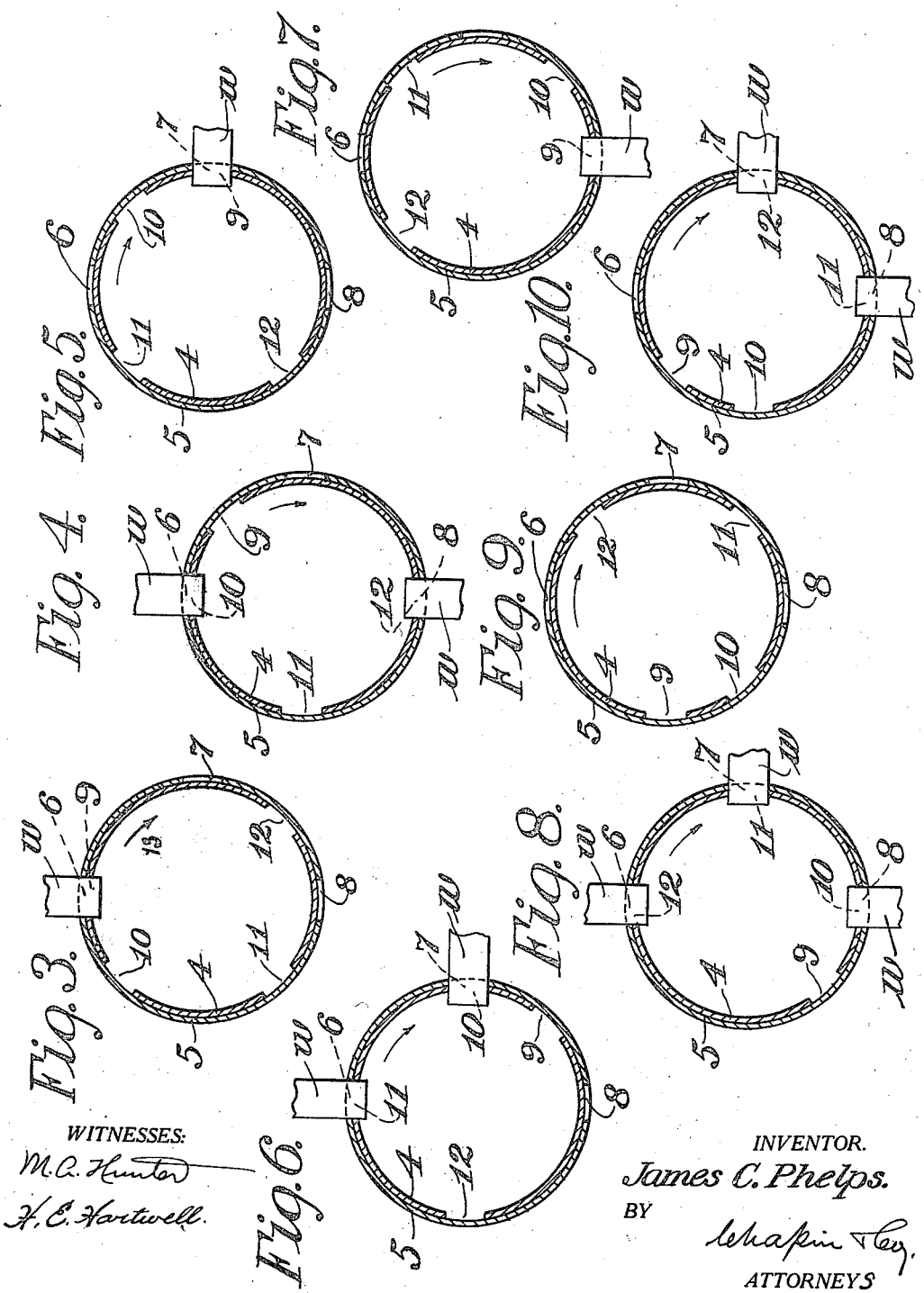

JAMES C. PHELPS, OF SPRINGFIELD, MASSACHUSETTS.

OUTLET OR JUNCTION BOX.

1,124,653.

Specification of Letters Patent.

Patented Jan. 12, 1915.

Application filed May 14, 1913. Serial No. 767,576.

*To all whom it may concern:*

Be it known that I, JAMES C. PHELPS, a citizen of the United States of America, residing at Springfield, in the county of Hampden and State of Massachusetts, have invented new and useful Improvements in Outlet or Junction Boxes, of which the following is a specification.

This invention relates to improvements in outlet or junction boxes for electrical fittings.

The invention is an improvement on the construction shown, described and claimed in my pending case for attachment for conduit outlet boxes, Serial No. 690,024, filed April 11, 1912.

In the present invention the improvement is confined to devices to permit the wires to be readily connected together within the box, or they may extend therefrom to one or more conduits that are suitably connected to the base portion of the box. The conduits employed are preferably of the well-known construction consisting of two separable members that are sprung or snapped together.

An object of the invention is to provide a bushing adjacent the inner end of the conduit,—said bushing being substantially U-shape in cross-section to correspond with the shape of the conduit and to permit the wires to pass or be drawn therethrough, and, also, to provide the cover with a rib-portion that will lie over the upper edge of the bushing to retain the wires in place when the cover is attached.

A further object of the invention is to provide means to permit openings in the flanged cover and base portions, respectively, of the box to register, or to be closed, as desired, whereby one or more external connections may be made with the wires within the box, as may be required.

A further object of the invention is to provide means to retain the cover in place, whereby the same may be readily attached and detached, as may be required, according to the number of outlet openings in use.

Referring to the drawings,—Figure 1 is a plan view of the complete outlet-box showing the parts assembled and with the cover partly cut away to clearly illustrate the manner in which the conduits are attached to the base-portion; also showing the relative location between the inner end of the conduit and the U-shaped bushing, with the wires passing from the outlet-box through the bushing and into the conduit member. This view also illustrates the manner in which the cover is secured to the base-member; also the adjustable bracket-member that secures the base-piece to the outlet or junction box proper. Fig. 2 is a vertical sectional view on the line 2—2 of Fig. 1, showing the cover and base members assembled and the construction of the bracket-member, with the bolts in place and the nuts thereon engaging the underside of the shoulder portion of the outlet-box; also showing the wires passing from the outlet-box to the conduit and the rib on the box engaging the upper portion of the bushing, with which the inner end of the conduit engages. Figs. 3, 4, 5, 6, 7, 8, 9, and 10 are horizontal sectional views taken through the depending and upwardly-extending flanges only of the cover and base member, respectively, as indicated by the broken line 3—10 of Fig. 2, showing the different positions of the flanged cover member with relation to the flanged base-member, whereby the openings in the flanges of each member may be made to register or to close as may be desired, according to the number of conduits that are to be used to permit the wires to extend from the outlet-box to one or more of the conduit branches. Fig. 11 is a detail horizontal sectional view on the line 11—11 of Fig. 2.

Referring to the drawings in detail,— $a$ designates the outlet or junction box of any approved construction, which is preferably formed from thin steel stampings and having a shoulder portion $b$ and an open-ended flange portion $c$. The wires are indicated as entering the box through suitable openings $d$. The plastering $e$ is applied to and around the shoulder portion $b$ and against the flange $c$. Extending over the flange $c$ and resting against the plastering $e$ is a base member formed with a bearing flange $f$, and formed integral with the portion $f$ is an inclined portion $g$ and a flange portion $h$ that is parallel with the bearing part $f$ which engages the plastering. The bearing flange portion $h$ is formed with an opening $i$ which receives an adjustable bracket-member $j$. This bracket-member is constructed with an outwardly-extending rim or flange portion $k$ and a pair of depending oppositely-located members $m$ that are parallel with each other. Each depending member $m$ of the bracket-member $j$ is provided with a vertically arranged recessed portion $p$ and a semi-circular groove $q$ as shown in dotted lines in Fig. 1. Passing through the flange $k$ are bolts $r$ having nuts $s$ on their lower ends which ride in the rectangular shaped recess $p$ and are prevented from turning thereby (see Fig. 11). The lower ends of the depending members $m$ are made inclined forming a cam surface, as indicated at $t$, whereby when the nuts $s$ are at the extreme lower ends of the bolts $r$ the latter can be tilted inwardly into the groove $p$, allowing the bracket $j$ to be readily inserted in the opening $i$ of the flange member $h$. As the bolts $r$ are rotated by means of a screw-driver, or other suitable implement, the nuts $s$ travel along the inclined ends $t$ and are forced or moved into engagement with the lower edge $b'$ of the shoulder $b$, as clearly shown in Fig. 2.

Formed integral with the bearing flange $f$ of the base member are bushing members $u$ that are substantially U-shape in cross-section. These members are open at the top to receive the wires $v$, as indicated in Figs. 1 and 2. These members are in alinement with the conduits $w$, the lower sections $w'$ of which are attached to the bearing flange part $f$ by means of the screws $x$. The inner end of the conduit $w$ bears against the bushing-member $u$, as shown. $y$ designates the cover or cap-member which extends over the base-member and closes the outlet-box. This cap-member is formed on the lower surface thereof with a rib 3 which substantially registers with the upper edge of the bushing-members $u$ and is designed to protect and confine the wires $v$ within this U-shaped passageway in order to retain them in place after the cap-member is assembled. The underside of this cap-member is formed with a depending flange 4, and the upper side of the base-member is formed with an upwardly-projecting flange or rim 5. This upwardly-extending flange is provided with three cut-out portions 6, 7 and 8, as shown in Figs. 3 to 10, inclusive, and as shown, these openings or cut-out portions are arranged 90° apart. The depending flange 4 of the cover-member $y$ is also provided with cut-out portions 9, 10, 11 and 12. In Fig. 3 a single conduit $w$ is shown with the openings 7 and 8 in the upwardly-extending flange 4 closed. In this arrangement only one branch or conduit is used. The openings 10, 11 and 12 are also closed. In Fig. 4 two conduits are used in the same line with each other. In this view the openings 6 and 8 are open and the other opening 7 is closed by the inner or depending flange 4. In this figure and the following figures, it is assumed that the cover $y$ has been rotated, in the direction of the arrow 13 a distance equal to that between the openings 9 and 10 of the flange 4. It should be stated that the upper edge $y'$ of the cover or cap-member $y$ is formed with notches or recesses $y^2$ that are 45° apart. These notches are for the purpose of securing the cap-member $y$ in place by means of the screws 14. The latter enter the threaded enlargements or bosses 15 of the base-member, which are formed integral with the bearing-flange $f$. By rotating the cap-member $y$ in the direction of the arrow 13—one step at a time—or the distance between two of the notches $y^2$, or 45°, the various combinations of the openings 6, 7 and 8 in the flange 5 and the openings or cut-out portions 9, 10, 11 and 12 in the flange 4 may be obtained. These various combinations are clearly shown in Figs. 3 to 10.

Referring now to Fig. 5, it will be seen that only one conduit $w$ is used which passes through the registering openings 7 and 9, the remaining cut-out portions in the two flanges 4 and 5 being closed,—the position of the conduit in this figure being 90° from that shown in Fig. 3.

In Fig. 6, after the cover has been advanced another 45°, or step, two conduits $w$ at right angles are shown, the remaining openings being closed.

In Fig. 7, after another step by the cover, the single conduit enters the box 180° from the position shown in Fig. 3 and 90° beyond that shown in Fig. 5, and with the other openings closed.

In Fig. 8, after another step of the cover $y$, three conduits $w$ are shown and only the cut-out portion 9 of the inner flange 4 is closed.

In Fig. 9, after another step of 45° of the cover $y$, it will be seen that all of the openings or cut-out portions in the two flanges are closed, while in Fig. 10, after another step of the cover $y$ 45°, two conduits are in use, as shown.

It will be seen from this construction and arrangement of the base and cap-members with the cut-outs in the flanges 4 and 5 thereof that any one of the eight combinations, as described, are possible. It will also be seen that the person installing a system of wiring may readily adjust the box to almost any position required in practice. Also, that the cap or cover member $y$ can be readily secured in place in any desired position by means of the screws 14, only two of which are necessary to secure the cap in place.

It should be stated that the purpose of forming the base-member with a raised central portion as indicated at $g$ is to allow sufficient room for the upwardly-extending flange portion $c$ as the thickness of the plastering varies. In some cases the thickness of the plastering *e* may be very thin, and in such case the rim *c* would extend almost to the underside of the flange-portion *h*.

It is, of course, clearly within the province of my invention to omit the box-member *a* and use only the base and cap members when it is desired to connect the wires together within the cap member. In such a case the invention would serve as a junction box only, it being understood that no outlet wires or branches are taken off from the wires within the box. The base-member would then simply be secured in any suitable manner to the support when it was desirable to connect the wires together. It will also be seen that by reason of the raised central portion of the base member, the conduits *w* will always leave the same nearly flush with the plaster line.

What I claim, is,—

1. In a junction or outlet box construction, the combination, of an outlet-box proper formed with an opening, of a base-member, a flange portion on said base-member adjacent to said box and elevated above the bearing surface of said base-member, said flange portion in the base member being formed with an opening in the center portion thereof to register with the opening in the outlet box, a cap-member to close the outlet opening of said box and extending over the base-member, the base and cap members being formed with oppositely-extending flanges having cut-out portions in said flanges, whereby when the cap-member is adjusted to various positions the wires from said box may be led off in various directions or branches, and means for securing the cap-member in the various positions of adjustment.

2. In an outlet or junction box construction, the combination, a junction-box proper, base and cap members having oppositely extending flanges, means to secure said base member to said box, said members having openings or cut-out portions in said flanges, means to adjustably secure the base and cap-members together to bring one or more of the openings in said flanges to register with each other when in one position and to close all of the openings in said flanges when in another position, as described.

3. In an outlet construction for electrical fittings, the combination, of a base member formed with a bearing surface, and an upper rim portion spaced from the bearing surface, a junction-box proper, means to secure the base-member to said box, the base member having bushing members open at the top to receive wires therein, the cap-member having a depending rim designed to register with the upper edges of the bushing members to close said bushing members after wires have been placed therein, and means to secure the cap-member to the base-member in various positions of adjustment, as described.

4. In an outlet or junction box construction, a base-member, a flange on said base member, said flange having cut-out portions therein, a cap-member, a depending flange on said cap member having cut-out portions therein so spaced that when the cap-member is turned relative to the base-member one or more of the cut-out portions or openings therein will register with openings in the cap member and, when the cap-member is adjusted to a certain position all of the openings in the two flanges of the base and cap-members will be closed, and means to secure the cap and base members together, as described.

5. In a junction or outlet box construction, the combination with said box, of a base-member, means to secure the same to the box, said box having an outwardly-extending flange-portion, the base-member having a raised central portion to receive the outwardly-extending flange portion of the box, a cap-member, and means to secure the same to the base-member in any one of a plurality of positions.

6. In an outlet-box construction, the combination with said box, of a base-member, a conduit secured thereto, said member having a U-shaped bushing integral therewith open at its upper part to retain the outlet wires in place at the point of entrance to the conduit which is secured to the base-member, and a cap-member having a rim thereon and located to register with the upper edge of the bushing to close the same, flanges on said cap and base members having cut out portions, said cut out portions arranged so that one or more may be closed as one member is moved relatively to the other, as described.

7. In an outlet-box construction for electrical fittings, the combination, of an outlet box, a base-member formed with threaded bosses, means to secure said base-member to the box, a cap-member formed with a flange portion and spaced recesses in the flange-portion thereof to receive said securing means which enter said bosses, and the base and cap members having flanges with openings therein and adapted to fit one within the other, whereby by means of said securing means the cap-member may be retained in different positions of adjustment relative to the base-member, as described.

8. In a junction or outlet-box construction, the combination, a base and cap-member, flanges thereon provided with cut out portions and arranged in overlapping relation, the base member having a bushing formed integral therewith and with one side open, a cap-member having a rim thereon to close the open side of the bushing when said cap-member is secured to the base-member, a conduit secured to the base-member in a position to register with said bushing whereby the conductors are protected and are held away from the inner end of the conduit which is attached to the base-member, as described.

9. In a junction-box, the combination of a base and cap member, each formed with a flange or rim portion having cut-out portions therein and positioned to fit one within the other, the cut-out portions being so located or arranged in the flange or rim portion to permit all or any one of the cut-out openings to be closed as one member is moved relative to the other.

10. In a junction or outlet box construction, the combination, of an outlet box, a base member formed with an opening in the center portion thereof, means to secure the base-member to said box, a cap member, flanged rims on said base member and on said cap member, said rims arranged in overlapping relation and provided with a plurality of openings therein, and means to secure the cap member to the base-member.

11. An outlet or junction box comprising, in combination, base and cap-members formed with openings therein to receive conduits, the location of the openings being such as to permit of the openings in one member to register with the same number of openings in the other member or any two of the openings in said members to register for the insertion of a conduit, means to adjust one member relative to the other as described, and means to retain the members in different positions of adjustment, as described.

JAMES C. PHELPS.

Witnesses:
HARRY W. BOWEN,
HENRY W. BOOTH.